United States Patent
Qi et al.

(10) Patent No.: US 11,480,953 B2
(45) Date of Patent: Oct. 25, 2022

(54) AUTONOMOUS BROADCASTING SYSTEM FOR SELF-DRIVING VEHICLE

(71) Applicant: LINGDONG TECHNOLOGY (BEIJING) CO. LTD, Beijing (CN)

(72) Inventors: Ou Qi, Beijing (CN); Chiung Lin Chen, Beijing (CN)

(73) Assignee: LINGDONG TECHNOLOGY (BEIJING) CO. LTD, Beijing (CN)

(*) Notice: Subject to any disclaimer, the term of this patent is extended or adjusted under 35 U.S.C. 154(b) by 253 days.

(21) Appl. No.: 16/320,882

(22) PCT Filed: Jan. 23, 2019

(86) PCT No.: PCT/CN2019/072793
§ 371 (c)(1),
(2) Date: Jan. 25, 2019

(87) PCT Pub. No.: WO2020/150916
PCT Pub. Date: Jul. 30, 2020

(65) Prior Publication Data
US 2020/0310399 A1 Oct. 1, 2020

(51) Int. Cl.
*G05B 19/418* (2006.01)
*H04W 4/80* (2018.01)
(Continued)

(52) U.S. Cl.
CPC ... *G05B 19/41895* (2013.01); *B60W 60/0025* (2020.02); *G01C 21/16* (2013.01); *H04W 4/80* (2018.02)

(58) Field of Classification Search
None
See application file for complete search history.

(56) References Cited

U.S. PATENT DOCUMENTS 7,639,142 B2 * 12/2009 Roeder ............... H01Q 13/22
705/28
8,648,709 B2 * 2/2014 Gauger ............... G08G 1/0962
340/539.1
(Continued)

FOREIGN PATENT DOCUMENTS

CN 204990397 U 1/2016
CN 105858045 A 8/2016
(Continued)

OTHER PUBLICATIONS

The International Search Report and Written Opinion for PCT/CN2019/072793 dated May 24, 2019 by WIPO.
(Continued)

*Primary Examiner* — Dale W Hilgendorf
(74) *Attorney, Agent, or Firm* — NZ Carr Law Office PLLC (57) ABSTRACT

Embodiments of the present disclosure include automated guided vehicles (AGVs) having a broadcasting system. In one embodiment, the self-driving system includes a body having one or more motorized wheels, a console coupled in an upright position to an end of the body, and a broadcasting system disposed at the console and is operable to send a notification to one or more mobile devices, wherein the broadcasting system uses a first type of positioning system and the one or more mobile devices use a second type of positioning system different from the first type of positioning system.

12 Claims, 8 Drawing Sheets

(51) Int. Cl.
  *B60W 60/00* (2020.01)
  *G01C 21/16* (2006.01)

(56) References Cited

U.S. PATENT DOCUMENTS

| | | | |
|---|---|---|---|
| 9,336,483 B1 | 5/2016 | Abeysooriya et al. | |
| 9,352,745 B1* | 5/2016 | Theobald | G05B 19/41895 |
| 9,892,353 B1* | 2/2018 | Lui | H04W 4/02 |
| 9,927,530 B2* | 3/2018 | Boyarski | G01C 21/16 |
| 10,015,839 B1* | 7/2018 | Depew | G08B 25/016 |
| 10,071,892 B2* | 9/2018 | High | A47F 10/04 |
| 10,255,769 B2* | 4/2019 | Sick | G05D 1/0214 |
| 10,380,473 B2* | 8/2019 | Manci | G05D 1/021 |
| 10,558,907 B2* | 2/2020 | Simon | G06K 9/00369 |
| 10,591,931 B1* | 3/2020 | Aggarwal | G05D 1/0011 |
| 2009/0014219 A1* | 1/2009 | Springston | B62B 5/0026 180/19.1 |
| 2009/0099898 A1* | 4/2009 | Ehrman | G06Q 10/06 705/7.15 |
| 2009/0210148 A1 | 8/2009 | Jayanthi | |
| 2011/0266078 A1* | 11/2011 | Hupke | B62B 5/0079 180/14.1 |
| 2012/0081248 A1 | 4/2012 | Kennedy et al. | |
| 2013/0317642 A1* | 11/2013 | Asaria | G06Q 50/28 700/216 |
| 2014/0074341 A1* | 3/2014 | Weiss | B66F 9/0755 701/25 |
| 2014/0277691 A1* | 9/2014 | Jacobus | G06Q 10/087 700/216 |
| 2015/0081088 A1* | 3/2015 | Lyon | G06Q 10/0875 700/216 |
| 2016/0034924 A1* | 2/2016 | Sorenson | H04W 4/02 705/7.29 |
| 2016/0041559 A1* | 2/2016 | Wellman | G06Q 10/0639 701/24 |
| 2016/0227350 A1* | 8/2016 | Zhang | H04B 7/15507 |
| 2016/0259061 A1 | 9/2016 | Carter | |
| 2016/0259346 A1* | 9/2016 | High | H04W 4/021 |
| 2016/0280523 A1* | 9/2016 | Hoffman | B62B 5/063 |
| 2017/0028564 A1* | 2/2017 | Lowy | G06Q 10/08 |
| 2017/0158431 A1* | 6/2017 | Hamilton | G05B 19/41895 |
| 2017/0318422 A1* | 11/2017 | Kokkonen | H04W 4/029 |
| 2017/0374511 A1* | 12/2017 | Buchmann | H04W 4/021 |
| 2018/0025460 A1* | 1/2018 | Watanabe | G06Q 10/063112 705/28 |
| 2018/0060831 A1* | 3/2018 | Swift | H04W 4/029 |
| 2018/0107999 A1* | 4/2018 | Rizzolo | H04W 4/30 |
| 2018/0129201 A1 | 5/2018 | Douglas et al. | |
| 2018/0137454 A1 | 5/2018 | Kulkarni et al. | |
| 2018/0158016 A1* | 6/2018 | Pandya | G05B 19/41895 |
| 2018/0239351 A1 | 8/2018 | Liang | |
| 2019/0049975 A1* | 2/2019 | Kattepur | G06Q 10/087 |
| 2019/0106167 A1* | 4/2019 | Niezgoda | B60K 7/0007 |
| 2019/0174569 A1* | 6/2019 | Braham | H04W 76/18 |
| 2019/0217478 A1* | 7/2019 | Johnson | G06Q 10/06398 |
| 2019/0243358 A1* | 8/2019 | Jaquez | G05D 1/0238 |
| 2019/0294836 A1* | 9/2019 | Hegde | H04L 9/0643 |
| 2019/0310655 A1* | 10/2019 | Voorhies | B66F 9/063 |
| 2020/0039747 A1* | 2/2020 | Ahmann | B65G 1/1375 |
| 2020/0102147 A1* | 4/2020 | Sullivan | B66F 9/065 |
| 2020/0342559 A1* | 10/2020 | Fujinoi | G08G 1/127 |
| 2021/0127634 A1* | 5/2021 | Griffioen | G01S 5/12 |

FOREIGN PATENT DOCUMENTS

| | | |
|---|---|---|
| CN | 106406306 A | 2/2017 |
| CN | 206363379 U | 7/2017 |
| CN | 107539690 A | 1/2018 |
| CN | 109205157 A | 1/2019 |

OTHER PUBLICATIONS

The First Office Action, Search Report and cited reference(s) for CN2019800022764 dated Jul. 31, 2020 by SIPO.

The EESR and cited reference(s) of the corresponding EP199111345 dated Jul. 11, 2022 by EPO.

Notice of Reasons for Refusal and cited reference(s) for JP2021-540463 dated Sep. 6, 2022 by JPO.

* cited by examiner

AUTONOMOUS BROADCASTING SYSTEM FOR SELF-DRIVING VEHICLE

BACKGROUND

Field

Embodiments disclosed herein relate to improved self-driving vehicle systems having an autonomous broadcasting system.

Description of the Related Art

Automatic Guided Vehicles (AGVs) are driverless, programmable controlled vehicles that can transport articles or inventory items from designated pickup area(s) to unloading area(s) within a facility. However, since conventional AGVs are not equipped with a robotic mechanism to autonomously load or unload inventory items from shelves, the AGVs have to wait for a long period of time before worker(s) arrive on the designated area and help the AGVs to load or unload the inventory items. As a result, the efficiency of loading/unloading process is decreased.

Therefore, there exists a need for an improved AGV that can improve the efficiency of loading/unloading process.

SUMMARY

Embodiments of the present disclosure include automated guided vehicles (AGVs) having a broadcasting system. In one embodiment, the self-driving system includes a body having one or more motorized wheels, a console coupled in an upright position to an end of the body, and a broadcasting system disposed at the console and is operable to send a notification to one or more mobile devices, wherein the broadcasting system uses a first type of positioning system and the one or more mobile devices use a second type of positioning system different from the first type of positioning system.

In another embodiment, a self-driving system includes a body having one or more motorized wheels, the body having a first end and a second end opposing the first end, a console coupling in an upright position to the first end of the body, and a broadcasting system disposed at the console, the broadcasting system being operable to send a notification to all mobile devices that have an estimated distance fell within a pre-determined range, wherein the estimated distance defines a distance between the mobile devices and the body and is determined based on a first type of positioning system used by the broadcasting system and a second type of positioning system used by the mobile devices, and the first type of positioning system is different from the second type of positioning system.

In yet another embodiment, a method of operating a self-driving system is provided. The method includes operating the self-driving system in a self-driving mode to a designated area of a facility, broadcasting a notification from the self-driving system to all mobile devices located within a pre-determined broadcasting range, wherein the pre-determined broadcasting range is determined based on information obtained from a first type of positioning system used by the self-driving system and a second type of positioning system used by the mobile devices, and the first type of positioning system is different from the second type of positioning system, and terminating broadcasting of the notification when a pre-determined number of the mobile devices accept a job task provided in the notification.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the present disclosure relate to automated guided vehicles (AGVs) having an autonomous broadcasting system. In various embodiments, once the AGV arrives at a designated area, the autonomous broadcasting system will send a broadcast notification to workers within a pre-determined range or workers who are responsible for the designated area. One or more workers may accept the job task and come to the AGV to perform the required task. The autonomous broadcasting system can increase the efficiency of loading/unloading process and avoid tasks from being left unattended. While the term AGV is used, the concept of this disclosure can be applied to any self-driving systems, such as driverless Forklift AGVs, or any mobile robots, such as autonomously-navigating mobile robots, inertially-guided robots, remote-controlled mobile robots, and robots guided by laser targeting, vision systems, or roadmaps. In addition, while the embodiments of this disclosure are described with respect to AGVs moving inventory in a warehouse environment, the embodiments and the concept may also be used in any type of environment such as hospital, airport, or shopping center, etc. Various embodiments are discussed in greater detail below with respect to FIGS. 1-8.

Figure 1:
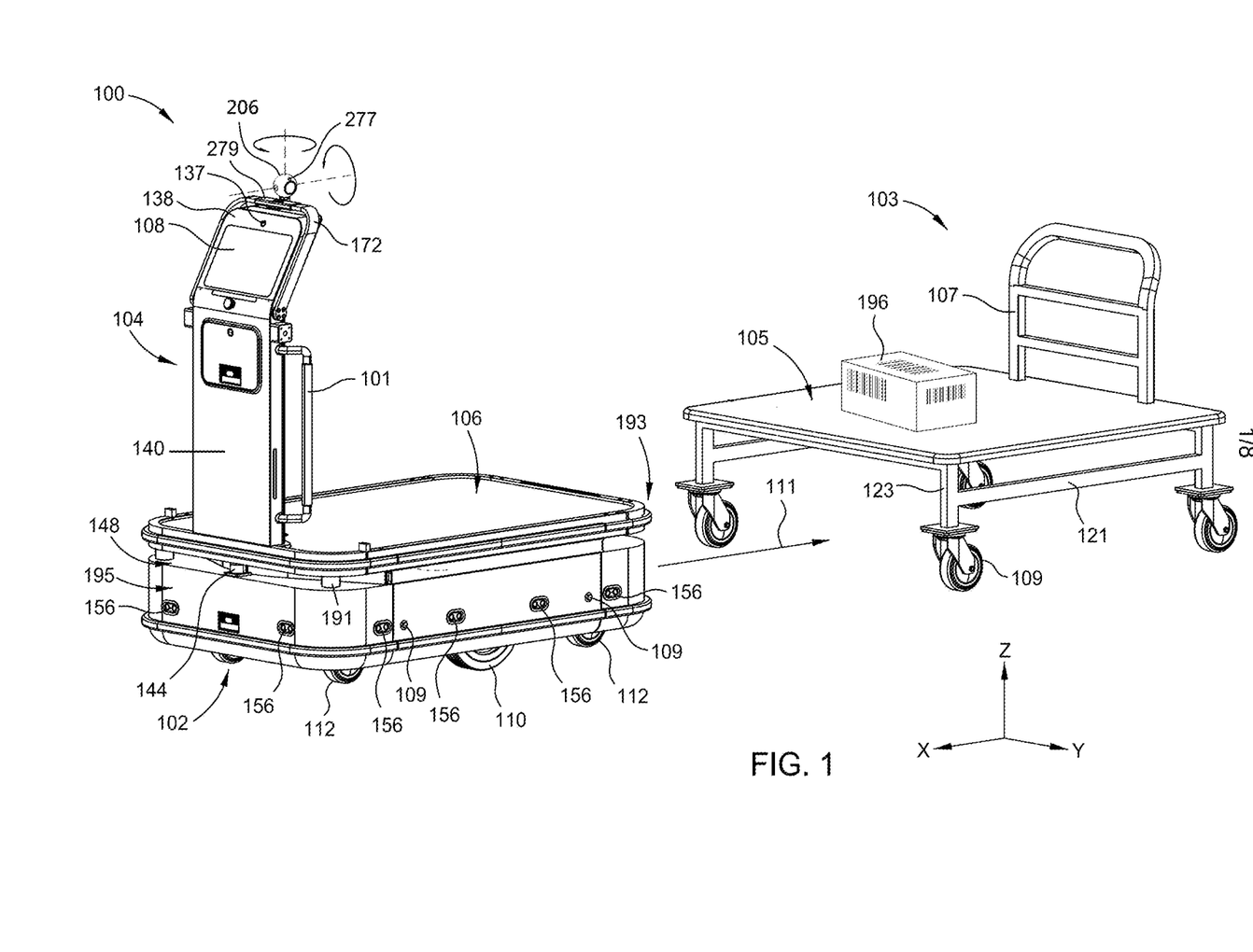
FIG. 1 is a perspective view of an automated guided vehicle (AGV) according to one embodiment.

FIG. 1 is a perspective view of an automated guided vehicle (AGV) 100 prior to engaging with an inventory holder 103 according to one embodiment. The AGV 100 is adapted to drive itself without an operator. The AGV 100 generally includes a mobile base 102 and a console 104. The mobile base 102 has a rear end 193 and a front end 195 opposing the rear end 193. The console 104 has an upper portion 138 and a main body 140. The main body 140 of the console 104 is coupled to the front end 195 of the mobile base 102 in a standing or upright configuration. One or more rods 101 are optionally provided on either side of the main body 140 to allow an operator to manipulate movement of the AGV 100.

The console 104 has a display 108 configured to display information. The display 108 allows the operator to control the operation of the AGV 100. The display 108 can be any suitable user input device for providing information associated with operation tasks, map of the facility, routing information, inventory information, and inventory storage, etc. If manual use of the AGV is desired, the operator can override the automatic operation of the AGV 100 by entering updated commands via the display 108, or by pulling down a U-shaped handle 172 that is pivotally coupled to the console 104. The U-shaped handle 172 is movable with respect to the console 104 between a retracted position (as shown) and a pull-down position to switch the operation mode of the AGV 100. When the handle 172 is in the pull-down position, the AGV 100 is switched to a manual control mode from a self-driving mode, which can be any operation mode, such as a self-navigation mode, a leading mode, or a people following mode, etc. In some cases, the AGV 100 may be stationary and not under any operation mode prior to switching to a manual control mode. The handle 172 has a control stick 279 which can be manipulated by the operator to control steering of the AGV 100.

The mobile base 102 has one or more motorized wheels 110 and a plurality of stabilizing wheels 112. The motorized wheels 110 are configured to rotate and/or roll in any given direction to move the AGV 100. For example, the motorized wheels 110 can rotate about the Z-axis and roll forward or backward on the ground about its axel spindle along any directions, such as along the X-axis or along the Y-axis. In this disclosure, moving forward refers to the situation when the front end 195 is the leading end and moving backward refers to the situation when the rear end 193 is the leading end. In some cases, the AGV 100 has one or more emergency stop button 109 that can be pressed to stop moving of the AGV 100. The motorized wheels 110 may be controlled to roll at different speed. The stabilizing wheels 112 may be caster-type wheels. If desired, any or all of the stabilizing wheels 112 may be motorized.

The mobile base 102 has an upper surface 106 that can be used to support a portion of an inventory holder 103. The inventory holder 103 generally includes a support plate 105, a handle 107 attached to a side of the support plate 105, and four wheels 109 coupled to the support plate 105 through support legs 123. The support plate 105 can be a flat solid plate or a grill-like structure for supporting an inventory item 196. The inventory holder 103 may optionally include one or more rods 121 connecting the support legs 123 to enhance the mechanical strength of the inventory holder 103. The inventory holder 103 is sized to accommodate with the mobile base 102. For example, the height of the support plate 105 and the distance between the front wheels 109 can be configured to allow a portion of the mobile base 102 (e.g., upper surface 106) to get under the support plate 105.

The AGV 100 is programmed and/or controlled to locate the inventory holder 103. Once the inventory holder 103 is located, the AGV 100 may engage with the inventory holder 103 and move the inventory holder 103 autonomously between designated areas within a facility based on pre-stored commands or instructions received from a remote server, which can be a warehouse management system (WMS). For example, the AGV 100 may receive an instruction related to transporting the inventory holder 103 to storage area, or to a receiving area where inventory items are to be loaded/unloaded.

In operation, the AGV 100 may move towards the inventory holder 103 along a direction indicated by an arrow 111. The arrow 111 is parallel with the longitudinal direction of the inventory holder 103. The AGV 100 has or can obtain information about the inventory holder 103, such as the specification, dimension, or shape, etc. The sensors or cameras of the AGV 100 can help identify the inventory holder 103 and guide the docking procedure of the AGV 100 with the inventory holder 103. Alternatively, an operator may manually dock the inventory holder 103 with the AGV 100. In either case, the inventory holder 103 is considered properly docked with the AGV 100 when the upper surface 106 of the mobile base 102 is substantially covered by the support plate 105, or when the AGV 100 is notified by sensors and/or cameras that a proper docking with the inventory holder 103 has been established.

The AGV 100 has a lifting system (not shown) disposed within the housing of the mobile base 102. The lifting system uses an actuator to move the mobile base 102 vertically with respect to the ground, thereby adjusting a height of the mobile base 102. After the inventory holder 103 is docked with the mobile base 102, the actuator moves up the mobile base 102 (and thus the upper surface 106) so that the mobile base 102 is in contact with the backside of the support plate 105, thereby lifting the inventory holder 103 off the ground.

Alternatively, the mobile base 102 may be engaged with the inventory holder 103 so that the inventory holder 103 can be pushed, pulled, rolled, carried, or otherwise moved by the mobile base 102. The term "engaged" used in this disclosure is refer to elements which are connected, attached, and/or coupled, either directly or integrally or indirectly via other elements, and either temporarily, removably, or even permanently.

The AGV 100 may move autonomously between designated areas within a facility based on commands or instructions received by the AGV 100. For example, the AGV 100 may receive a command that transports the inventory holder 103 to inventory storage, or to a pick-up/drop off area where inventory items are to be loaded/unloaded. Upon arrival of the designated area, the AGV 100 may use the actuator to lower the inventory holder 103 and return to location of departure or other pre-determined destinations. Alternatively, the inventory holder 103 may be removed from the AGV 100 by an operator.

Figure 2:
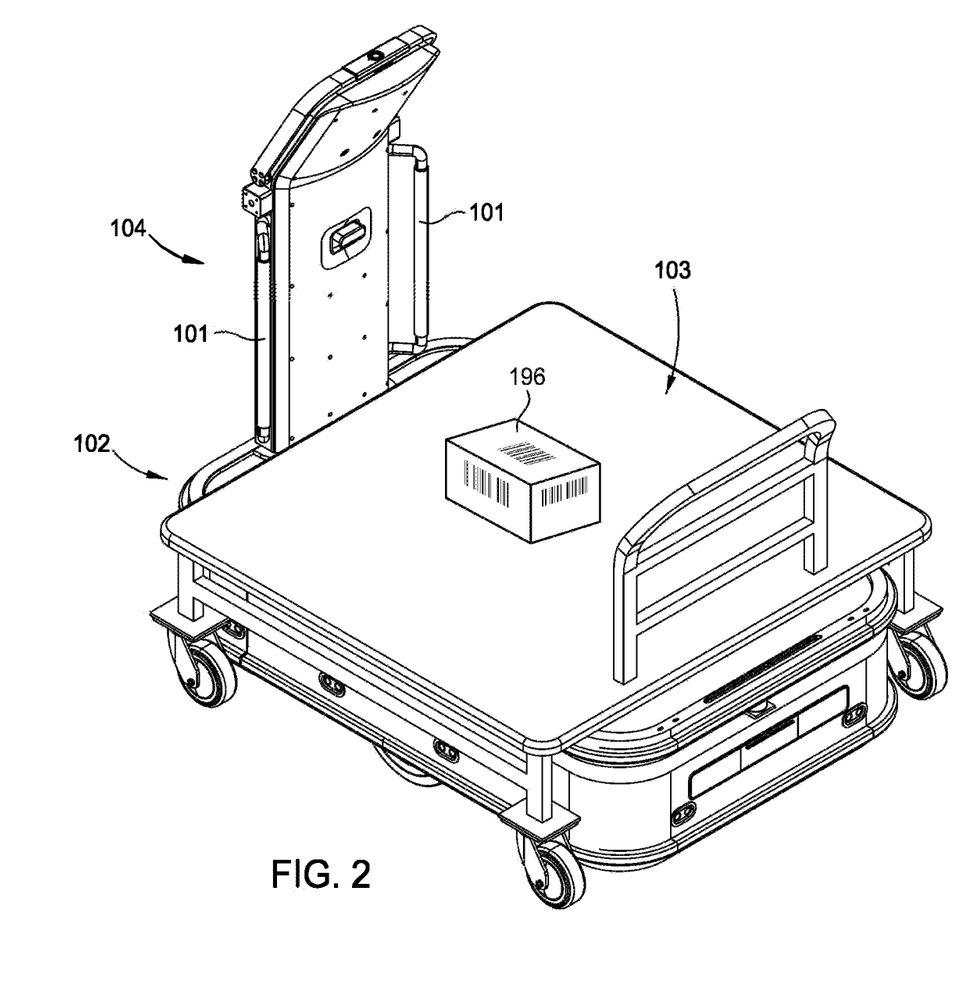
FIG. 2 is a perspective view of an inventory holder positioned on an upper surface of the mobile base of the AGV according to one embodiment.

FIG. 2 is a perspective view of an inventory holder 103 positioned on the upper surface 106 of the mobile base 102 of the AGV 100 according to one embodiment. Inventory (not shown) can be positioned directly on the inventory holder 103. The AGV 100 can move the inventory and/or inventory holder 103 from one location to another location. Although the inventor holder 103 is shown as a handcart having wheels, the inventory holder 103 can be a basket, a bin, or any other type of wheeled cart or container that can be used to contain, carry and/or transport items, such as inventory.

Referring back to FIG. 1, the AGV 100 includes one or more cameras for capture images and/or videos of the surroundings of the AGV 100. In some embodiments, the AGV 100 includes an overview camera 137 disposed on the console 104, for example at an area adjacent the display 108. The overview camera 137 is facing away from the rear end 193 of the AGV 100 and is used for object/obstacle detection and avoidance. In some cases, the overview camera 137 can also be configured to identify a shelf and/or an operator so that the AGV 100 can maintain a proper/pre-determined distance with the operator under various operation modes, such as a people following mode.

The longitudinal direction of the upper portion 138 of the console 104 is held at an angle with respect to the longitudinal direction of the main body 140. The angle is chosen so that the overview camera 137 can identify the near objects effectively. The angle may be in a range from about 105° to about 165°, such as about 120° to about 150°. Wider or narrower range of angles is contemplated and can be adjusted depending on the application.

The AGV 100 may include one or more proximity sensors to detect the presence of objects nearby and/or measure distances from the objects nearby. For example, one or more sensors 156 may be provided around the mobile base 102 (only two sides are shown). The sensors 156 may be any suitable sonar sensors, ultrasonic sensors, infrared sensors, radar sensors, LiDAR sensors and/or any suitable proximity sensors that can be configured to detect the presence of nearby objects. Each sensor 156 can be configured to sense a field of view greater about 90 degrees.

In some embodiments, one or more sensors 144 may be further provided at the front end 195 and the rear end 193 of mobile base 102, respectively, for obstacle avoidance. For example, the sensors 144 may be provided at the front end 195 and the rear end 193 (only front end is shown). The sensor 144 can be disposed at a cutout 148 below the console 104. The cutout 148 extends across the width of the mobile base 102 and may expand radially outwardly from the sensor 144 to the edge of the mobile base 102. The expansion of the cutout 148 allows the sensors to provide greater sensing area for the AGV 100. Alternatively or additionally, a sensor 191 similar or identical to the sensor 144 may be disposed at one or more corners of the mobile base 102. Likewise, the sensor 144, 191 may be any suitable sonar sensors, ultrasonic sensors, infrared sensors, radar sensors, and/or laser sensors such as LiDAR (light detection and ranging) sensors that can be configured to maintain proper distance and detect the presence of nearby objects that are stationary or moving. Each sensor 144, 191 can be configured to sense a field of view greater about 90 degrees, for example about 270 degrees.

The upper portion 138 of the console 104 can be configured to support a camera 206. The camera 206 configured to have at least two axes of rotation (e.g., vertical rotation and horizontal rotation). The camera 206 has an optical zoom and is capable of recording visual images and/or detecting the presence of nearby objects. The camera 206 can have a 180 degree viewing area, a 270 degree viewing area, a 360 degree viewing area, or any viewing area between 180 degrees and 360 degrees. The cameras 206 may include a monocular camera, a binocular camera, and/or a stereo camera. In one embodiment, the camera 206 is configured to detect and follow an object (e.g., a human operator) in motion. In some embodiments, the camera 206 may further include a beam pointer 277. The beam pointer 277 is operable to produce a laser beam for identifying an object based on the task instruction. The camera 206 can be controlled to scan a barcode, a marker, or an identifier of one or more objects disposed on a shelf/AGV 100, and/or a barcode, a marker, or an identifier disposed on the shelf.

Figure 3:
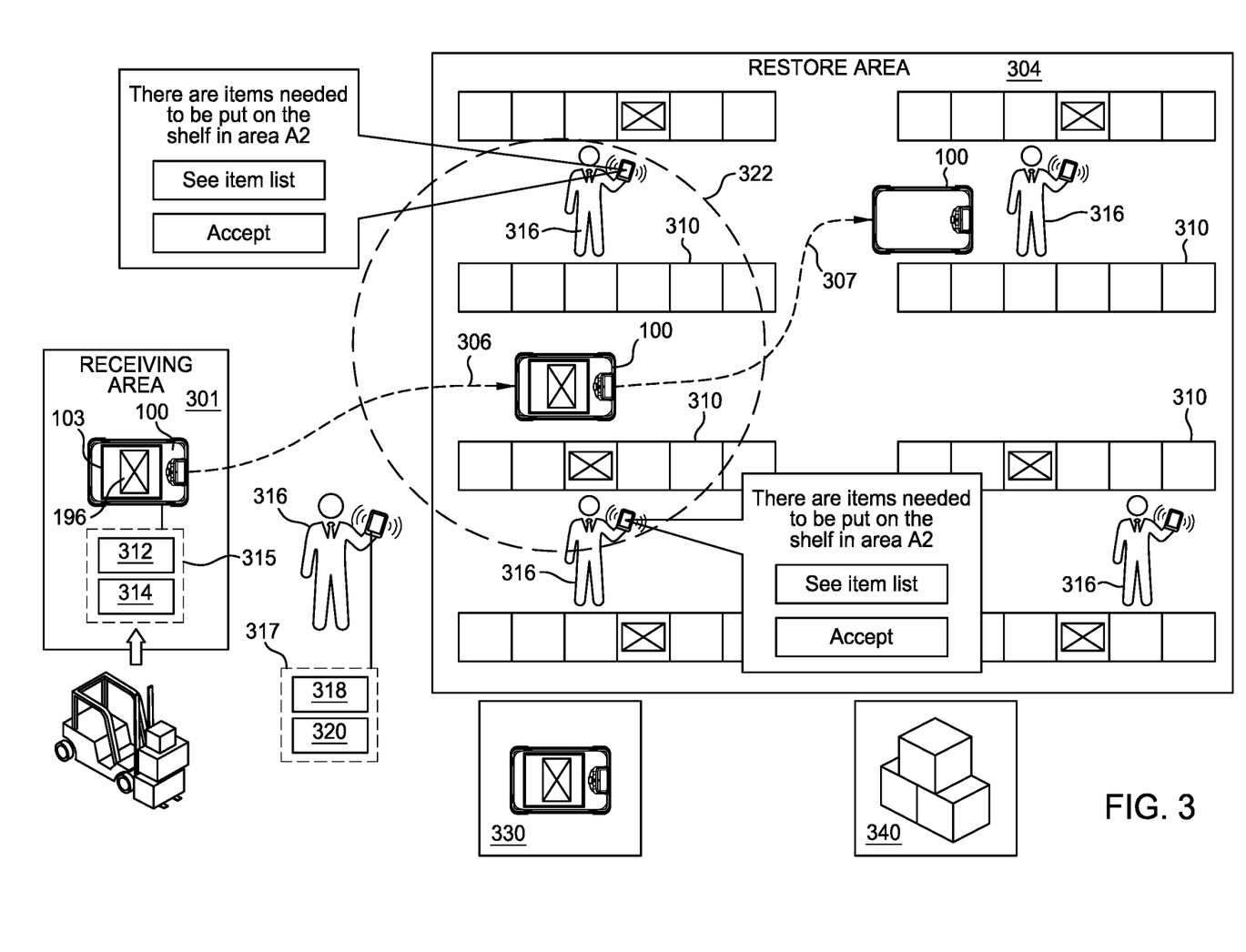
FIG. 3 illustrates a schematic view of the AGV moving from a receiving area to a storage area of a warehouse according to one embodiment.
Figures 4A, 4B:
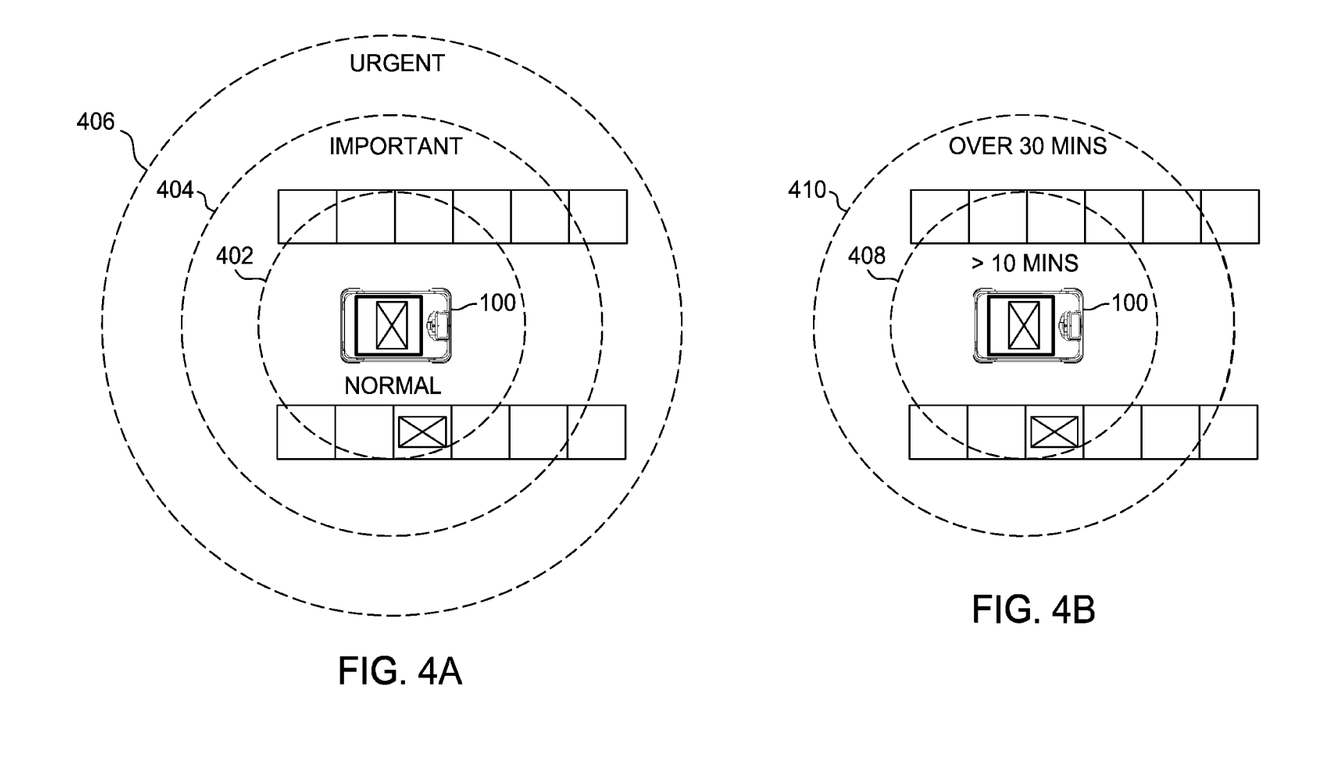
FIG. 4A illustrates an example of notification mechanism according to one embodiment.
FIG. 4B illustrates an example of notification mechanism according to one embodiment.

FIG. 3 illustrates a schematic view of the AGV 100 moving from a receiving area 301 to a storage area 304 of a warehouse according to one embodiment. The AGV 100 may be instructed or provided with routing information and task instructions to follow a travel path 306 and take the inventory holder 103 and/or an inventory 196 to the storage area 304 where one or more inventory racks or shelves 310 are located. The routing information may be selected by the remote server (e.g., warehouse management system (WMS)) or manually entered into the AGV 100 by an operator. In one embodiment shown in FIG. 3, the AGV 100 is further equipped with a broadcasting system 315. The broadcasting system 315 may be disposed in the console 104 or mobile base 102 of the AGV 100. The broadcasting system includes a wireless communication device 312 and a positioning device 314. One or more workers 316 are shown located at the storage area 304. Each worker 316 has a mobile device 317, which is also equipped with a wireless communication device 318 and a positioning device 320. Depending on the task instructions, the wireless communication device 312 of the AGV 100 can send broadcast notification associated with the task instructions to one or more workers 316 via the wireless communication device 318 of the mobile device 317 carried by the workers 316. As will be discussed in greater detail below, the broadcast notification may only be received by, for example, workers that are within a pre-determined broadcasting range, or by workers that are responsible for designated areas.

The mobile device 317 may be a cellular phone, a tablet, a wristband, a computer, or any other device that can be configured with the wireless communication device 318 and the positioning device 320 to communicate with the broadcasting system 315 of the AGV 100. The broadcast notification, task instructions, or command is communicated wirelessly over an internet, through a wired connection, or using any suitable manner to communicate with an operator or the WMS. Examples of wireless communication may include, but are not limited to, radio frequency identification (active and/or passive), WiFi, ultra-wideband, BLUETOOTH®, and/or any other form of communication.

Task instructions and/or related information may include, but are not limited to, move inventory items between various locations of the warehouse, for example, from the receiving area 301 to the storage area 304, from the storage area 304 to a packing station 330, from the packing station 330 to a shipping station 340, or any other tasks that may involve moving the AGV 100 within the warehouse. In operation, the AGV 100 may autonomously transport the inventory items under a self-driving mode, which can be any operation mode, such as a self-navigation mode, a leading mode, or a people following mode, etc.

The AGV 100 is programmed or controlled to send a broadcast notification associated with the task instructions to workers (e.g., workers 316) when the AGV 100 arrives at a destination (e.g., storage area 304). In some embodiments, the AGV 100 is programmed or controlled to send the broadcast notification when the AGV 100 is about to arrive at the destination. In some embodiments, the AGV 100 is programmed or controlled to send the broadcast notification at any time prior to arriving at the destination. Once the AGV 100 arrives at the destination, the AGV 100 may stay at the destination until the worker(s) complete the task. Alternatively, the AGV 100 may unload the inventory holder 103 and proceed to the next destination(s) follow a travel path 307.

Broadcast notification may include, but are not limited to, move inventory items from an AGV (e.g., AGV 100) to an inventory shelf, move inventory items from the inventory holder (e.g., inventory holder 103) to an inventory shelf, or any other tasks that may require a recipient to perform within the warehouse. For example, an example broadcast notification may be "There are items needed to be put on the shelf 12 in area A2". The broadcast notification can be received simultaneously by one or more workers 316. The workers can view the item list shown on the mobile device 317 and accept the job task. The item list may include any information regarding the inventory items that are to be moved and/or have been moved to the shelf 310. The worker who accepted the job task may proceed to the destination and perform the task based on the broadcast notification they received. In some cases, the job task may be accepted by more than one recipient, or any number of recipients, depending on the amount of work and the requirement set by the WMS.

The broadcast notification can be sent repeatedly in a basic time interval of pre-determined duration, for example about 1 minute to about 60 minutes, such as about 5 minutes to about 10 minutes. The frequency of the broadcasting can be adjusted based on the level of importance or other factors desired by the WMS. Once the job task has been accepted by a worker or a pre-determined number of workers, the rest of the workers within the broadcasting range may no longer receive the notification. In some cases, the mobile device 317 may send a notice of acceptance or the like to the WMS and/or the broadcasting system 315 of the AGV 100. The broadcasting system 315 is then directed or programmed to terminate broadcasting of the notification.

The wireless communication device 312 of the broadcasting system 315 can be programmed or controlled to send the broadcast notification having a broadcasting range 322. All workers near or within the broadcasting range 322 will receive the broadcast notification accordingly. The broadcasting range 322 may have 360 degrees of radial coverage, with its center located at the AGV 100. In some embodiments where the AGV 100 is programmed or instructed to drop off the inventory holder 103 and leave for the next destination, the center of the broadcasting range 322 can be set at the inventory holder 103, or at any inventory item waiting to be taken care of. In such a case, the AGV 100 will broadcast the location of the inventory holder 103 (or the inventory item) discharged from the AGV 100, instead of the location of the AGV 100 itself.

The broadcasting range 322 may have a radial distance ranging from about 5 meters to about 800 meters, such as about 20 meters to about 300 meters. It is contemplated that the broadcasting range 322 can be programmed or controlled to have a narrower or greater coverage, depending upon the essence of the task and/or the number of workers required to complete the task. The broadcasting range 322 can be increased according to the importance or emergency level of the task. For example, in one embodiment shown in FIG. 4A, an initial broadcasting range 402 can be assigned to all broadcast notifications having a job task categorized as "normal" importance. A broader broadcasting range 404 can be assigned to all broadcast notifications having a job task categorized as "important" importance. A greatest coverage of broadcasting range 406 can be assigned to all broadcast notifications having a job task categorized as "urgent" importance.

Alternatively, the broadcasting range can be increased over time if the job task is not accepted within a pre-determined duration of time. For example, in one embodiment shown in FIG. 4B, the broadcasting range may be increased from an initial broadcasting range (e.g., initial broadcasting range 402 of FIG. 3) to a broader broadcasting range 408 if a broadcast notification was sent and no job task has been accepted for more than 10 minutes, for example. The broadcasting range may be increased from the broadcasting range 408 to a greatest broadcasting range 410 if a broadcast notification was sent and no job task has been accepted for more than 30 minutes, for example. The pre-determined duration of time may be in a range from about 2 minutes to about 2 hours and can be adjusted based on the level of importance or other factors desired by the WMS.

Figure 5:
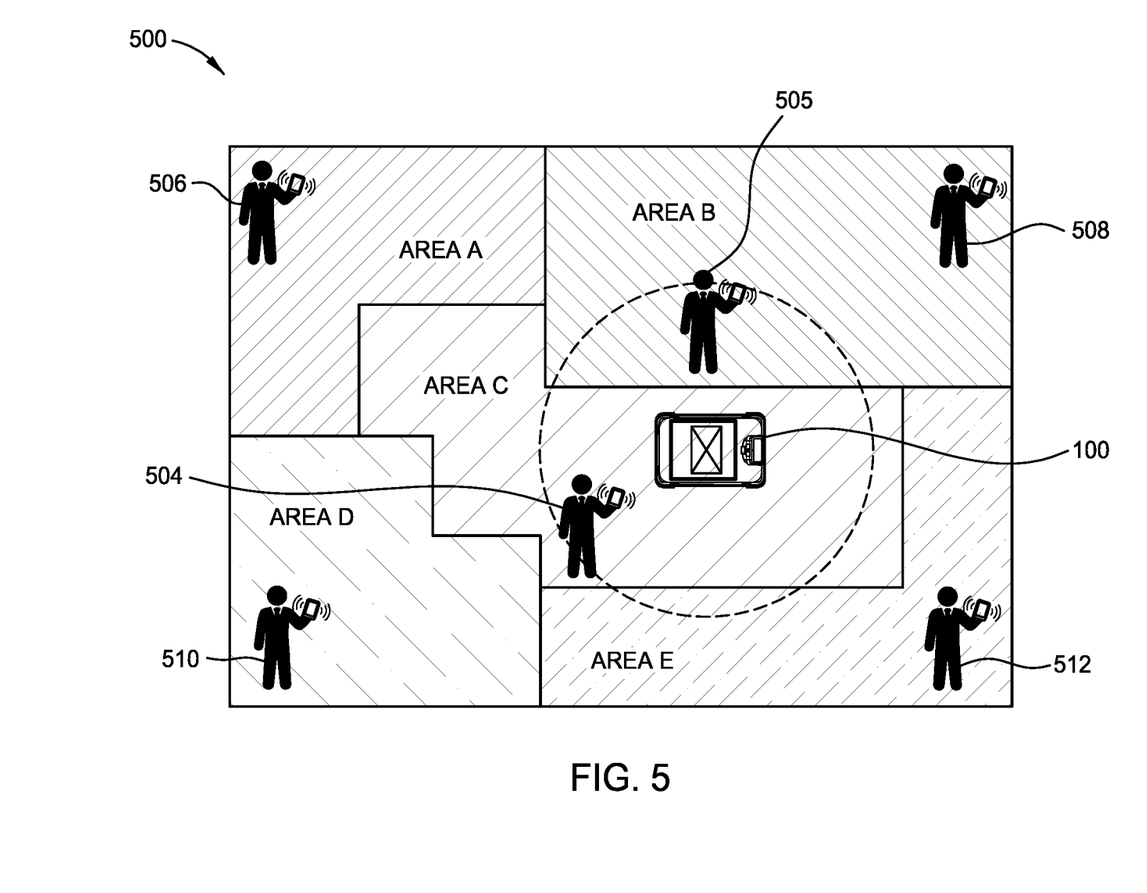
FIG. 5 illustrates a portion of a warehouse showing the AGV has some job tasks that need help from workers.

In some embodiments, which can be combined with any of the embodiments described in this disclosure, the AGV 100 is programmed or controlled to send a broadcast notification that may only be received by workers responsible for the designated working areas. In other words, the broadcast notification is sent to selected mobile devices (and thus selected workers). FIG. 5 illustrates a portion of a warehouse 500 showing the AGV 100 has arrived at area C of the warehouse 500 and has some job tasks that need help from workers. In such a case, the AGV 100 can be programmed or controlled to send a broadcast notification to workers 504, 505 who are responsible for area C. Workers 506, 508, 510 and 512 may not receive the broadcast notification since they are responsible for different areas, e.g., areas A, B, D, and E, respectively. If desired, the AGV 100 can be programmed or controlled to send a broadcast notification to all workers within the warehouse. In such a case, the workers who are responsible for area C (or certain shelves at area C) and the workers who are responsible for areas adjacent to area C may both receive the broadcast notification. Once the job task is accepted by the worker 504, the worker 505 may no longer take the job task, or vice versa.

In some embodiments, which can be combined with any of the embodiments described in this disclosure, the AGV 100 is programmed or controlled to send a broadcast notification to workers whose mobile device 317 has an estimated distance (between the AGV 100 and mobile devices 317) fell within a pre-determined range. The estimated distance can be calculated using the data/signal strength between the high/low accuracy positioning systems used by the AGV 100 and the mobile device 315. The calculation can be done using a remote server or a Peer-to-Peer communication, as will be discussed in more detail below with respect to FIGS. 7 and 8.

Figure 6:
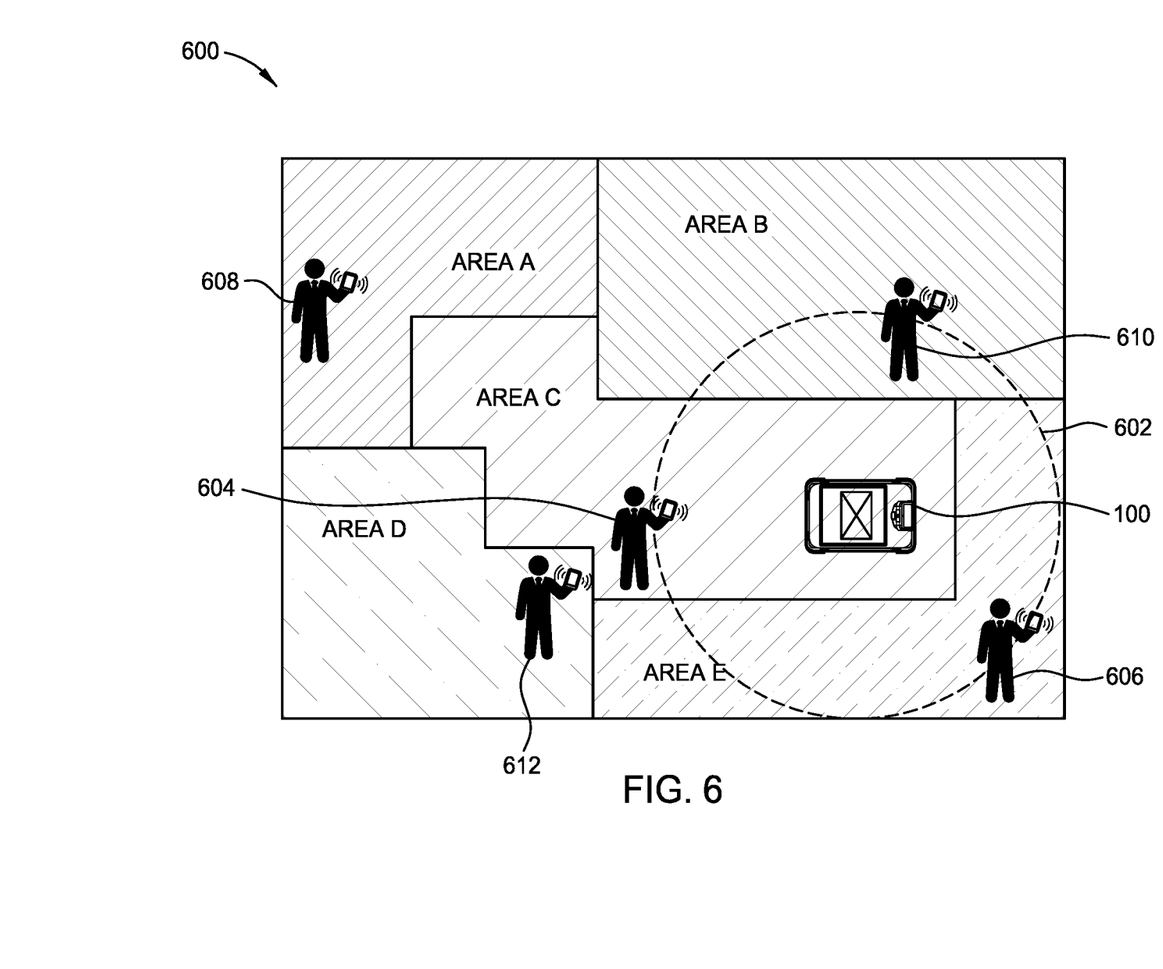
FIG. 6 illustrates a portion of a warehouse showing the AGV has some job tasks that need help from workers.

In some embodiments, which can be combined with any of the embodiments described in this disclosure, the broadcast notification may only be received by workers who are suitable to perform the job task and/or workers at or near working areas related to the job task. FIG. 6 illustrates a portion of a warehouse 600 showing the AGV 100 has arrived at area C of the warehouse 600 and has some job tasks that need help from workers. In this embodiment, the AGV 100 is programmed or controlled to send a broadcast notification with a broadcasting range 602 covering areas B, C and E since job tasks performed in these areas are closely related. In such a case, workers 604, 606, 610 will receive the broadcast notification. Workers 608, 612 may not receive the broadcast notification since they are at areas A and D where job tasks performed in these areas may not related to the job task to be performed at area C. In some cases, the AGV 100 is programmed or controlled so that worker 612 may still receive the broadcast notification because he/she is near area C and may offer to help if the job task has not been accepted for over a pre-determined period of time. In some cases, all the workers can view accepted tasks and nearby tasks waiting to be accepted on their mobile devices. In any case, once the job task is accepted by the worker 604, the workers 606, 610 may no longer take the job task, or vice versa.

Figure 7:
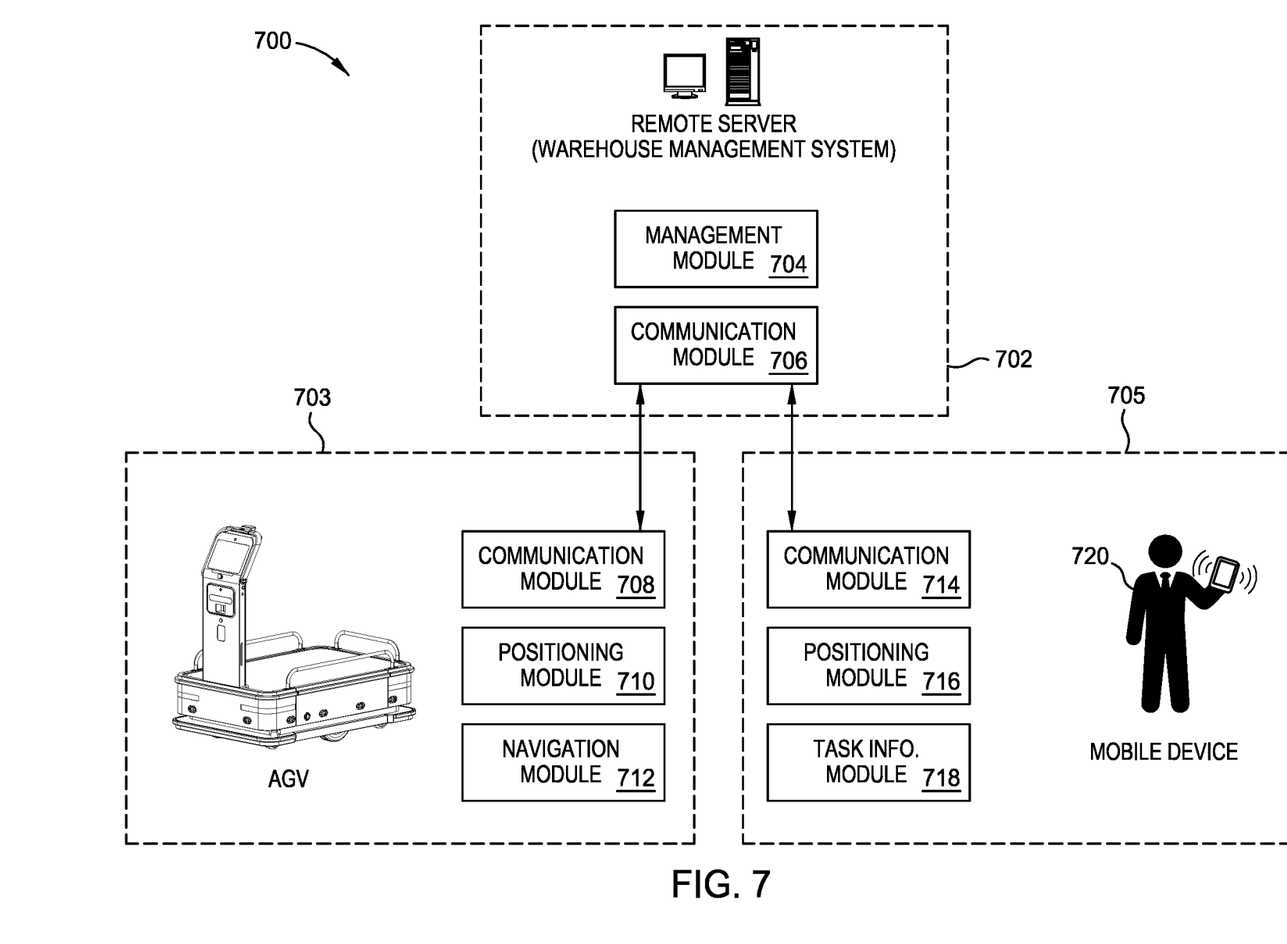
FIG. 7 illustrates a communication system that can be used for notification broadcasting according to one embodiment.

FIG. 7 illustrates a communication system 700 that can be used for notification broadcasting according to one embodiment. The communication system 700 is managed by a remote server 702 and can be used to determine or estimate positions of an AGV 703 and a mobile device 705. The remote server 702 is a suitable server used in a warehouse, such as a warehouse management system. The remote server 702 includes a management module 704 and a communication module 706. The management module 704 is operable to store, process and control information related to task instructions, map information, routing information, people recognition information, inventory information, and any other information that may be required to perform operations of the warehouse. The communication module 706 can be any suitable communication device using wireless technology to transmit or receive information and/or task instructions from the management module 704 to the AGV 703 or the mobile device 705.

The AGV 703 is an autonomous vehicle, such as the AGV 100 discussed above. The AGV 703 includes a communication module 708 and a positioning module 710, which function as a broadcasting system for the AGV 703. The AGV 703 further includes a navigation module 712. The communication module 708 (e.g., wireless communication device 312 discussed above) of the AGV 703 can transmit, or receive information/instructions from the remote server 702. The positioning module 710 (e.g., positioning device 314) of the AGV 703 can communicate information regarding the position of the AGV 703 to the communication module 708. The navigation module 712 may include information relating to a current location of the AGV 703, a target destination, and location-dependent navigation options. The communication module 708, the positioning module 710, and the navigation module 712 enable the AGV 703 to perform various operation mode, for example a self-navigation mode.

The mobile device 705 includes a communication module 714, a positioning module 716, and a task information module 718. The communication module 714 (e.g., wireless communication device 318 discussed above) of the mobile device 705 can transmit, or receive information/instructions from the remote server 702. The positioning module 716 (e.g., positioning device 320) of the mobile device 705 can communicate information regarding the position of the mobile device 705 to the communication module 714. The task information module 718 can receive, store, transmit, and show information/instructions from an operator 720 or the AGV 703 through the remote server 702. The task information module 718 can also show accepted tasks and nearby tasks waiting to be accepted.

The positioning module 710 of the AGV 703 and the positioning module 716 of the mobile device 705 may use the same or different types of positioning system. In some embodiments, the positioning module 710 of the AGV 703 may use a high accuracy positioning system and the positioning module 716 of the mobile device 705 may use a low accuracy positioning system, or vice versa. Examples of high accuracy positioning system may include, but are not limited to, a simultaneous localization and mapping (SLAM) or visual SLAM (VSLAM) based system that may use one or more sensors (e.g., proximity sensor 156) and/or cameras (e.g., camera 137) of the AGV 100, an inertial measurement system that uses gyroscopes, wheel encoders (odometers) and accelerometers (collectively referred to as inertial measurement units (IMU), various markers disposed within the warehouse, or any suitable indoor positioning system. Markers may be reflective markers or any suitable identifiers containing inventory or shelf information, including but not limited to the type of inventory, the quantity of inventory, the location of the shelves, and/or any instructions related to the inventory, such as routing and/or task instructions associated with the inventory, the worker and/or the AGV.

Examples of low accuracy positioning system may include, but are not limited to, a WiFi/LiFi based positioning system, a BLUETOOTH® beacons (or any low energy based proximity sensing system), a magnetic positioning system, a system using dead reckoning technology, or any suitable indoor positioning system. In some embodiments, the positioning module 710 of the AGV 703 may also use one or more of the low accuracy positioning systems, such as WiFi based or BLUETOOTH® based positioning system. Other suitable positioning technique, such as GPS, may also be used to determine the location of the AGV 703 and/or the mobile device 705.

In some embodiments, the remote server 702 may use one or more high accuracy positioning systems to determine or estimate location of the AGV 703. The remote server 702 may use one or more low accuracy positioning systems to determine or estimate location of the mobile device 705 (and therefore location of the workers). The locations of the AGV 703 and the mobile device 705 can be used to determine distance/coverage of the broadcasting range and recipients of the broadcast notifications to perform broadcasting of the notifications discussed in various embodiments of this disclosure.

Figure 8:
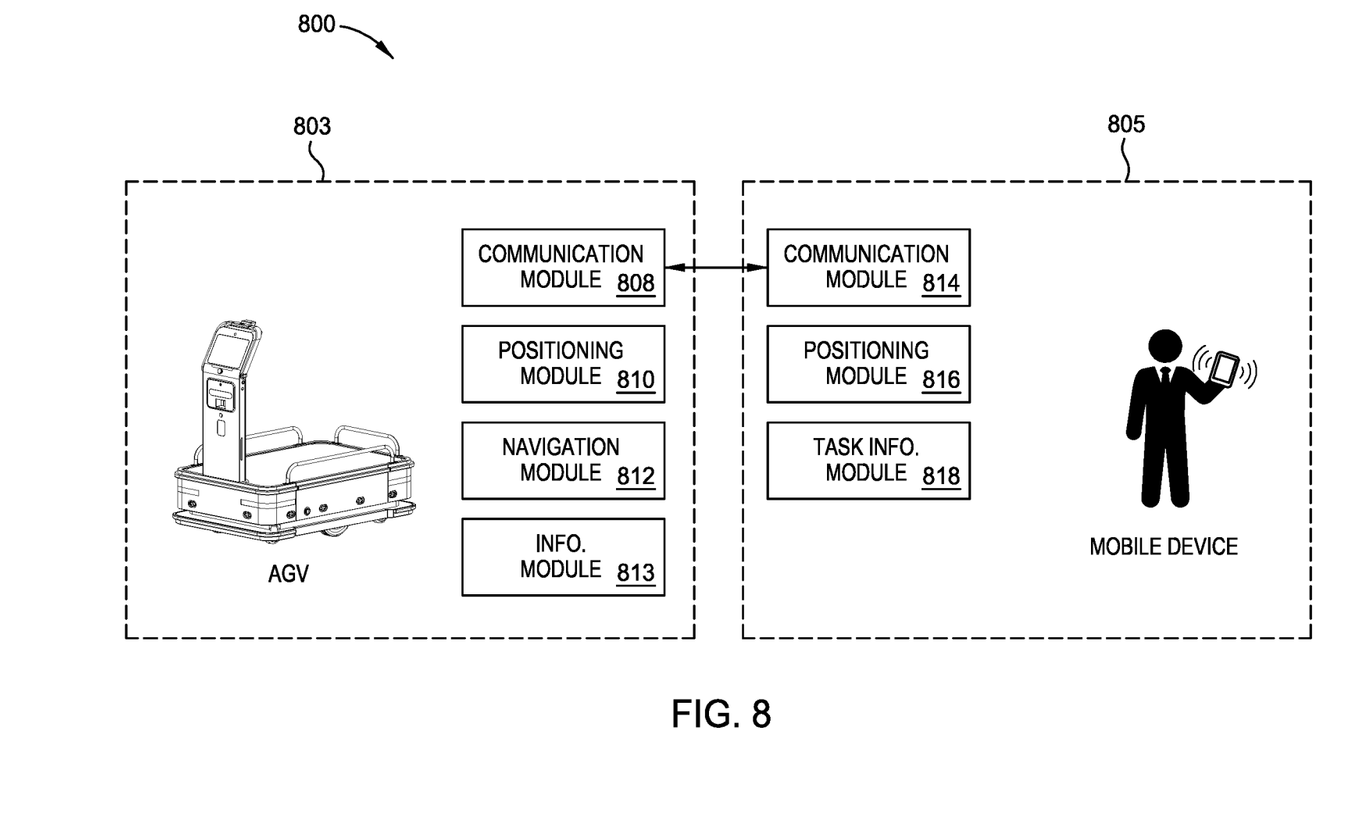
FIG. 8 illustrates a communication system that can be used for notification broadcasting according to another embodiment.

FIG. 8 illustrates a communication system 800 that can be used for notification broadcasting according to another embodiment. An AGV 803, such as the AGV 100, includes a communication module 808, a positioning module 810, and a navigation module 812, which can be identical or functionally similar to the communication module 708, the positioning module 710, and the navigation module 712 discussed above in FIG. 7. The AGV 803 further includes an information module 813 containing information related to carried inventory items or inventory items to be carried by the AGV 803. The mobile device 805, such as the mobile device 317, includes a communication module 814, a positioning module 816, and a task information module 818, which can be identical or functionally similar to the communication module 714, the positioning module 716, and the task information module 718 discussed above in FIG. 7. The communication module 808 of the AGV 803 and the communication module 814 of the mobile device 805 can communicate to each other via a wireless communication, which may include, but are not limited to, radio frequency identification (active and/or passive), WiFi, ultra-wideband, BLUETOOTH®, and/or any other form of communication.

In this embodiment, the remote server is not used to determine locations of an AGV 803 and a mobile device 805. Instead, the strength of wireless signal, such as WiFi signal or BLUETOOTH® signal, is used to estimate the distance between the AGV 803 and the mobile device 805. In such cases, the estimated distance between the AGV 803 and mobile device 805 can be calculated using the data obtained from any one or more of the high/low accuracy positioning systems used by the AGV 803 and the mobile device 805. The calculation of the estimated distance can be done by the AGV 803, the mobile device 805, or both. The AGV 803 will send a broadcast notification to all mobile device(s) 805 having an estimated distance fell within a pre-determined range. The pre-determined range may be in a range from about 2 meters to about 500 meters, such as about 5 meters to about 200 meters. Workers who receive the broadcast notification on their mobile device may accept the task and perform the task accordingly.

In cases where the broadcast notification is sent per designated working area, the AGV 803 may send the broadcast notification regarding the task (and shelves information associated with the task) to all the mobile devices 805 within the facility. Workers who are responsible for the designated working area, workers who are responsible for shelves in the designated working area, workers who are responsible for areas adjacent to the designated working area, and/or workers who are suitable to perform the task may all receive the broadcast notification. One or more workers may accept the task and perform the task accordingly.

In summary, embodiments of the present disclosure provide an automated guided vehicle (AGV) having an autonomous broadcasting system. The AGV is programmed or controlled to send a broadcast notification when the AGV arrives at a designated area. The broadcast notification may be received by workers within a pre-determined range or by workers who are responsible for the designated area. One or more workers may accept the job task described in the broadcast notification and come to the AGV to perform the required task. The frequency of the broadcasting and the pre-determined range may be increased depending upon the level of the importance, for example. The autonomous broadcasting system can increase the efficiency of loading/unloading process within a facility and avoid tasks from being left unattended.

While the foregoing is directed to embodiments of the disclosure, other and further embodiments of the disclosure thus may be devised without departing from the basic scope thereof, and the scope thereof is determined by the claims that follow.

The invention claimed is:

1. A self-driving system, comprising:
a body having one or more motorized wheels;
a console coupled in an upright position to an end of the body; and
a broadcasting system disposed at the console and is operable to send a notification to be received by one or more mobile devices by means of broadcasting the notification, wherein the notification has a broadcasting range, and the broadcasting system is configured to increase the broadcasting range if one or more mobile devices are not responsive for more than a pre-determined duration of time,
wherein the broadcasting system uses a first type of positioning system and the one or more mobile devices use a second type of positioning system different from the first type of positioning system, wherein the first type of positioning system has higher accuracy than the second type of positioning system, the first type of positioning system is a high accuracy positioning system comprising a simultaneous localization and mapping (SLAM) or visual SLAM (VSLAM) based system, an inertial measurement system, markers, or any combination thereof, and the second type of positioning system is a low accuracy positioning system comprising a WiFi/LiFi based positioning system, a wireless communication beacon, a magnetic positioning system, a system using dead reckoning technology, or any combination thereof.

2. The system of claim 1, further comprising:
an actuator operable to adjust a height of the body; and
an inventory holder removably disposed on the body, the inventory holder comprising wheels and an inventory supporting surface.

3. The system of claim 1, wherein the broadcasting system is configured to send the notification to multiple mobile devices using a Peer-to-Peer communication.

4. The system of claim 1, wherein the one or more mobile devices are associated with a designated area or associated with recipients related to the designated area.

5. The system of claim 1, wherein the broadcasting system is configured to adjust the broadcasting range depending on an importance level of the notification.

6. The system of claim 5, wherein the broadcasting range has a radial distance ranging from 20 meters to 300 meters.

7. A method of operating a self-driving system, comprising:
operating the self-driving system in a self-driving mode to a designated area of a facility;
estimating a distance between the self-driving system and one or more mobile devices located within the facility using a strength of a wireless signal from a first type of positioning system used by the self-driving system and a strength of a wireless signal from a second type of positioning system used by the one or more mobile devices, wherein the first type of positioning system has higher accuracy than the second type of positioning system;
broadcasting from the self-driving system a notification to be received by one or more mobile devices that has the estimated distance falling within a pre-determined broadcasting range of the self-driving system; and
terminating broadcasting of the notification when one or more mobile devices respond to the notification sent from the self-driving system; and
increasing a coverage of the pre-determined broadcasting range if one or more mobile devices is not responding over a pre-determined duration of time or an importance level of the notification is changed.

8. The method of claim 7, wherein the first type of positioning system is a high accuracy positioning system comprising a simultaneous localization and mapping (SLAM) or visual SLAM (VSLAM) based system, an inertial measurement system, markers, or any combination thereof, and the second type of positioning system is a low accuracy positioning system comprising a WiFi/LiFi based positioning system, a wireless communication beacon, a magnetic positioning system, a system using dead reckoning technology, or any combination thereof.

9. A self-driving system, comprising:
a body having one or more motorized wheels;
a console coupled in an upright position to a front end of the body; and
a broadcasting system disposed at the console and is operable to send a notification to be received by one or more mobile devices by means of broadcasting the notification via a wireless communication, wherein the notification has a broadcasting range, and the broadcasting system is configured to increase the broadcasting range if one or more mobile devices are not responsive for more than a pre-determined duration of time,
wherein the broadcasting system uses a first type of positioning system and the one or more mobile devices use a second type of positioning system different from the first type of positioning system, and wherein the first type of positioning system has higher accuracy than the second type of positioning system.

10. The system of claim 9, further comprising:
one or more proximity sensors disposed at corners of the body.

11. The system of claim 10, further comprising:
- a first LiDAR sensor disposed at a first cutout extending across a front side of the body; and
- a second LiDAR sensor disposed at a second cutout extending across a rear side of the body.

12. The system of claim 11, wherein the first cutout expands radially and outwardly from a center of the front side to opposing sides of the body, and the second cutout expands radially and outwardly from a center of the rear side to the opposing sides of the body.

\* \* \* \* \*